(12) United States Patent
Zhang et al.

(10) Patent No.: US 9,564,269 B2
(45) Date of Patent: Feb. 7, 2017

(54) FAST-MOUNTING CAPACITOR

(71) Applicants: SHANGHAI HAOYE ELECTRIC CO., LTD, Shanghai (CN); SHANGHAI HAOYE CAPACITORS CO., LTD, Shanghai (CN)

(72) Inventors: Zikui Zhang, Shanghai (CN); Feng Xu, Shanghai (CN); Hao Pan, Shanghai (CN)

(73) Assignees: SHANGHAI HAOYE ELECTRIC CO., LTD, Shanghai (CN); SHANGHAI HAOYE CAPACITORS CO., LTD, Shanghai (CN)

( * ) Notice: Subject to any disclaimer, the term of this patent is extended or adjusted under 35 U.S.C. 154(b) by 253 days.

(21) Appl. No.: 14/381,208

(22) PCT Filed: Sep. 25, 2012

(86) PCT No.: PCT/CN2012/001305
§ 371 (c)(1),
(2) Date: Aug. 26, 2014

(87) PCT Pub. No.: WO2013/127043
PCT Pub. Date: Sep. 6, 2013

(65) Prior Publication Data
US 2015/0062773 A1  Mar. 5, 2015

(30) Foreign Application Priority Data
Feb. 27, 2012  (CN) .......................... 2012 2 0065218

(51) Int. Cl.
| H01G 2/04 | (2006.01) |
| H05K 7/02 | (2006.01) |
| H05K 3/30 | (2006.01) |
| H01G 4/232 | (2006.01) |
| H05K 7/10 | (2006.01) |
| H05K 7/12 | (2006.01) |
| H05K 5/00 | (2006.01) |
| H01G 4/228 | (2006.01) |
| H01G 9/08 | (2006.01) |

(Continued)

(52) U.S. Cl.
CPC ................ *H01G 2/04* (2013.01); *H01G 2/106* (2013.01); *H01G 9/08* (2013.01); *H01G 11/82* (2013.01); *Y02E 60/13* (2013.01)

(58) Field of Classification Search
CPC .......... H01G 9/155; H01G 2/04; H01G 4/232; F16B 43/00; H05K 7/02; H05K 3/301
USPC ............... 361/502, 821, 328, 830, 271, 541, 809,361/808, 308.2, 752, 306.1
See application file for complete search history.

(56) References Cited

U.S. PATENT DOCUMENTS 6,783,376 B2 *  8/2004  Will .................... H05K 3/301
                                                 439/383

* cited by examiner

*Primary Examiner* — Eric Thomas
*Assistant Examiner* — Arun Ramaswamy
(74) *Attorney, Agent, or Firm* — Kening Li; Miller Canfield

(57) ABSTRACT

A fast-mounting capacitor is composed of a capacitor (1) and a plug-in sheet (10). A fixed rod (22) extends from the lower end of the shell of the capacitor (1). The fixed rod (22) has a fixed slot (18). The plug-in sheet (10) includes an insulating strip (11) provided above. Plastic elastic clamps (12) and a connection part (13) are connected to the lower part of the insulating strip (11). Fixing clamping strips (17) are provided on the inner wall of the capacitor mounting hole (15). The capacitor can be plugged in conveniently, and can effectively serve as an insulator, therefore it can prevent conducting leakage of electricity to the box of electrical (Continued)

equipment so as to cause accident when abnormal leakage occurs to the capacitor.

5 Claims, 5 Drawing Sheets

(51) Int. Cl.
*H01G 11/82* (2013.01)
*H01G 2/10* (2006.01)

FAST-MOUNTING CAPACITOR

FIELD OF THE INVENTION

The present invention is related to a capacitor, especially a fast-mounting capacitor.

BACKGROUND

One of the fixed installation structures of the capacitor on the current market is: as shown in FIG. 1, it employs a structure with a gasket 7 and a nut 8. The disadvantage of such a structure is: 1) it needs a set of gasket 7 and nut 8. The anti—salt-spray-corrosion quality of the gasket 7 and the nut 8 needs to be controlled. And it is difficult to control such quality. 2) The fixed installation difficulty is big. It is even more difficult to install when the installation room is small. 3) When there is electricity leakage in the capacitor, the electricity is easy to be conducted from the fixed installation screw 21, the gasket 7 and the screw 8 to the electrical box and causes an accident.

Another fixed installation structure of the capacitor on the current market is: as shown in FIG. 2, a capacitor with fast-docking structure. The advantage of such structure is that it is easy to install and is not restricted by the installation room. But the disadvantage is: 1) an anchor-shaped flex card 5 is needed, wherein the anchor-shaped flex card 5 is made of spring steel sheet. The anti—salt-spray-corrosion quality thereof needs to be controlled. And it is difficult to control such quality. 2) The anchor-shaped flex card 5 needs to be fixed on the outer shell beforehand, which is an extra process step; 3) When there is abnormal electricity leakage in the capacitor occurs, the electricity can easily be conducted from the anchor-shaped flex card 5 to the electrical box and causes an accident.

SUMMARY OF THE INVENTION

The goal of the current invention is to provide a fast-mounting capacitor, which overcomes the disadvantages mentioned above. The fast-mounting capacitor of the current invention is not only easy to dock, but can be insulated easily and prevents the situation in which when an abnormal electricity leakage occurs, the electricity is conducted to the electrical box and causes an accident.

The goal is achieved as the follows:

A fast-mounting capacitor, comprising a capacitor and a plug-in sheet, characterized in that a fixed rod extends from the lower end of the shell of the capacitor, wherein the fixed rod has a fixed slot, and the plug-in sheet includes an insulating strip provided above, wherein plastic elastic clamps and a connection part are connected to the lower part of the insulating strip, and wherein the insulating strip and the connection part are provided with a capacitor mounting hole, and wherein fixing clamping strips are provided on the inner wall of the capacitor mounting hole.

A fast-mounting capacitor, characterized in that the capacitor mounting hole has a polygonal cross-section, and the fixed rod also has a polygonal cross-section corresponding to the capacitor mounting hole.

A fast-mounting capacitor, characterized in that the fixed rod of the capacitor is inserted into the capacitor mounting hole and is snapped into the fixed slot with the help of the clamping strips.

A fast-mounting capacitor, characterized in that the lower part of the fixed rod is still situated inside the capacitor mounting hole.

A fast-mounting capacitor, characterized in that the lower part of the insulating strip is provided with protrusions.

A fast-mounting capacitor, characterized in that the upper peripheral of the insulating strip has an annular wall, wherein the annular wall and the insulation strip forms a bowl shape.

Through the structures above, the current invention possesses the following advantageous technical effects.

1. The current invention employs a docking structure with plastic flex card, and therefore the docking of the capacitor is very easy to operate.

2. The current invention uses insulation material, and therefore an effective insulation effect can be achieved. It can thus be avoided that when an abnormal electricity leakage occurs, the electricity would be conducted to the electrical box.

3. The upper part of the plug-in sheet of the current invention is provided with a capacitor mounting hole, wherein the inner wall of the capacitor mounting hole is provided with fixed clamping strips, so that a fast mounting between the capacitor and the plug-in sheet can be achieved.

Figure 1:
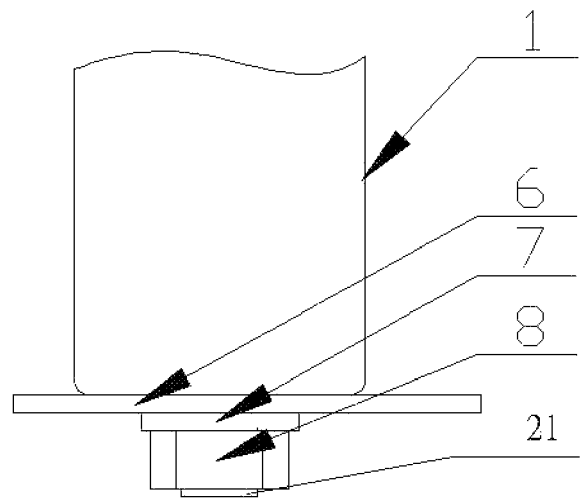
FIG. 1 shows the mounting structure of a capacitor in the state of the art.
Figure 2:
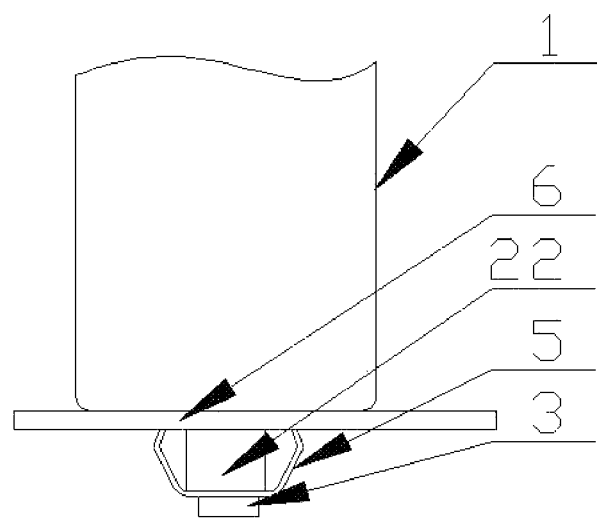
FIG. 2 shows the mounting structure of another kind of capacitor in the state of the art.

In the figures: 1—capacitor; 21—fixed installation screw; 22—fixed rod; 3—flex card installation rod; 5—anchor-shaped flex card; 6—fixed installation plate; 7—gasket; 8—nut; 10—plug-in sheet; 11—insulation strip; 12—plastic flex card; 13—connection part; 14—protrusion; 15—capacitor mounting hole; 17—fixed clamping strips; 18—fixing card slot.

DESCRIPTION OF THE PREFERRED EMBODIMENT

Example 1, a fast-mounting capacitor, is illustrated with the help of the figures.

Reference is made to FIGS. 4-8, wherein the structure of the plug-in sheet of capacitor of example 1 is shown. It includes an insulating strip 11 provided above, wherein plastic elastic clamps 12 and a connection part 13 are connected to the lower part of the insulating strip 11, and wherein the insulating strip 11 and the connection part 13 are provided with a capacitor mounting hole 15, and wherein fixing clamping strips 17 are provided on the inner wall of the capacitor mounting hole 15.

Figure 9:
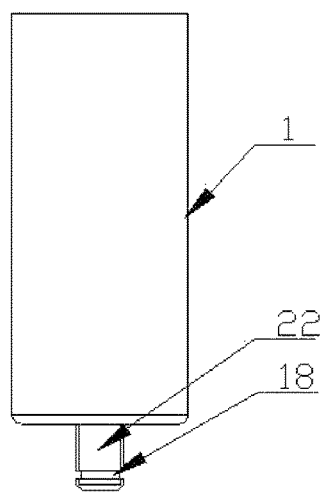
FIG. 9 is the structure of the capacitor shell which matches example 1 of the current invention.

FIG. 9 is the structure of the capacitor shell which matches example 1 of the current invention. As shown in the figure, a fixed rod 22 extends from the lower end of the shell of the capacitor 1, wherein the fixed rod 22 is provided with a ring-shaped card slot 18.

The current invention comprises the above described capacitor and the plug-in sheet. They can be sold after assembly or sold separately and can be assembled by the user.

Figure 3:
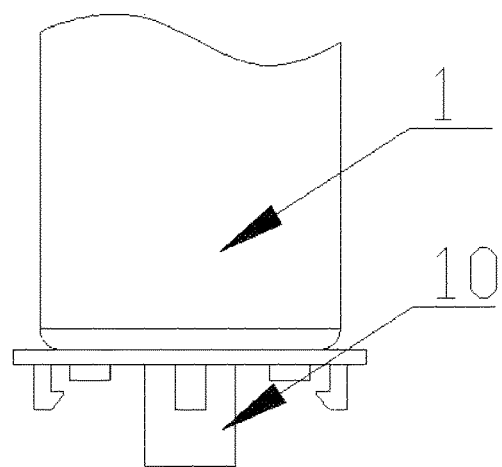
FIG. 3 shows the structure of example 1 of the current invention.
Figure 4:
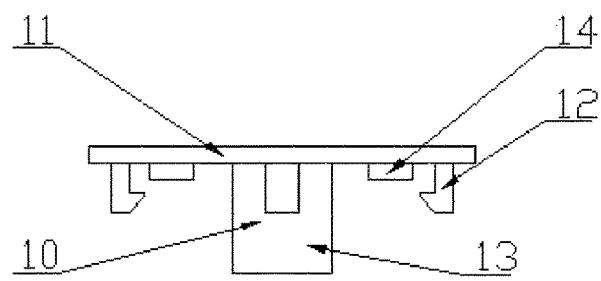
FIG. 4 shows the structure of the plug-in sheet of the capacitor as shown in example 1 of the current invention.
Figure 5:
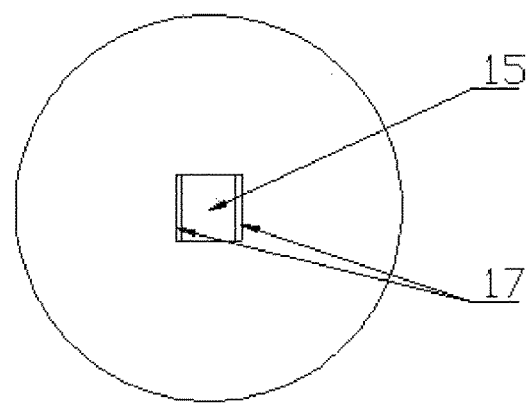
FIG. 5 is the top view of the plug-in sheet of the capacitor as shown in example 1 of the current invention.
Figure 6:
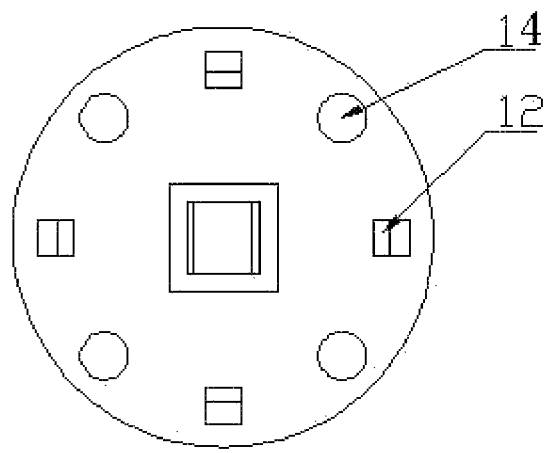
FIG. 6 is the bottom view of the plug-in sheet of the capacitor as shown in example 1 of the current invention.
Figure 7:
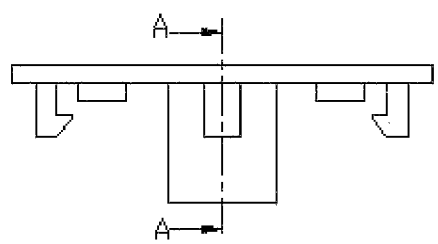
FIG. 7 is the side view of the plug-in sheet of the capacitor as shown in example 1 of the current invention.
Figure 8:
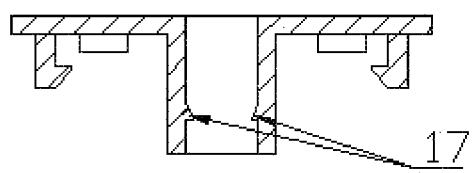
FIG. 8 is the A-A cutaway view of FIG. 7
Figure 11:
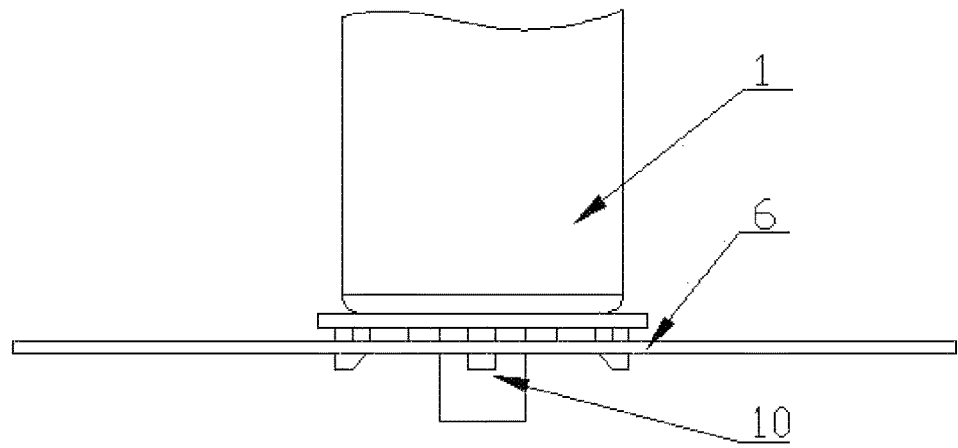
FIG. 11 is the application structure of example 1 of the current invention.

When the capacitor 1 is connected with the plug-in sheet, as shown in FIG. 3, the fixed rod 22 of the capacitor 1 is inserted into the capacitor mounting hole 15 of the plug-in sheet, and with the help of the fixed clamping strips 17, it is snapped into the fixed slot 18, so that a vertical fixation is achieved. As an ideal way of assembly, as shown in FIG. 11, it should be assured that the lower part of the fixed rod 22 is still situated inside the capacitor mounting hole 15.

In order to ensure that there is no rotation along the Longitudinal axis when the capacitor 1 is assembled with the plug-in sheet, the capacitor mounting hole (15) has a polygonal shape (such as the quadrangle in FIG. 5), and the fixed rod (22) also has a polygonal shape corresponding to the capacitor mounting hole (15).

Figure 10:
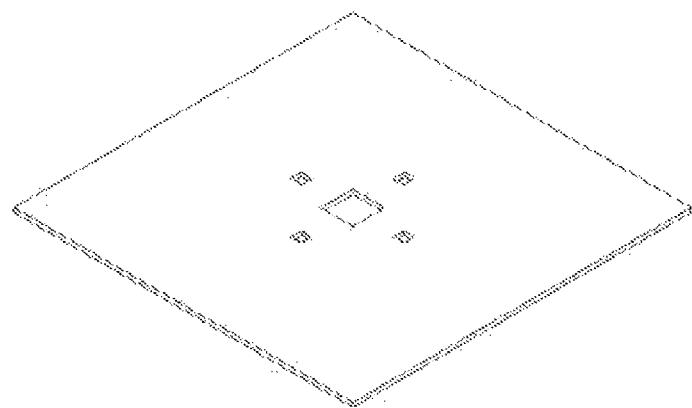
FIG. 10 is the structure of the installation plate which matches example 1 of the current invention.

In this example, with the help of the plastic flex card 12 which is connected with the lower part of the capacitor 1, it can be easily inserted into the fixing installation plate 6. As shown in FIG. 10, the fixing installation plate 6 is provided with fixing docking holes corresponding with the plastic flex card 12 on the plug-in sheet and the connection part 13. During the installation, the plug-in sheet is firmly fixed onto the installation plate through the plastic flex card 12, as shown in FIG. 11. It realizes a quick docking operation of the capacitor. Since the docking structure of the capacitor employs all insulation material, an effective insulation effect can be achieved. And it can be avoided that when there is abnormal electricity leakage, the electricity would be conducted to the electric box.

In addition, the lower part of the insulation strip 11 is provided with protrusions 14, so that the plastic flex card 12 can be elevated and the elasticity of the plastic flex card 12 can be improved.

Figure 12:
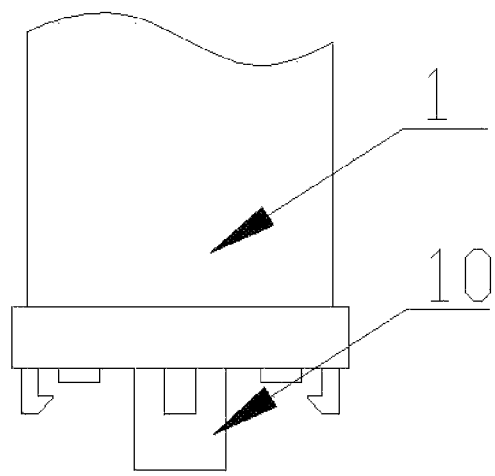
FIG. 12 is the structure of example 2 of the current invention.
Figure 13:
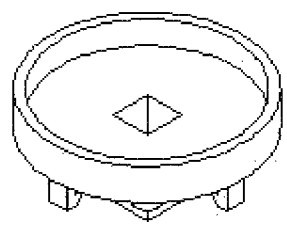
FIG. 13 shows the structure of the plug-in sheet of the capacitor as shown in example 2 of the current invention.

FIG. 12 is the structure of plug-in sheet of example 2 of the current invention. In this example, the upper peripheral of the insulating strip 11 has an annular wall, wherein the annular wall and the insulation strip 11 forms a bowl shape. The function of such arrangement is to improve the insulated electrical clearance as well as the creepage distance. FIG. 13 shows the structure of the assembled capacitor in example 2.

What is claimed is:

1. A fast-mounting capacitor, comprising a capacitor having a shell with a lower end and a plug-in sheet, wherein a fixed rod extends from the lower end of the shell of the capacitor, wherein the fixed rod has a fixed slot, and the plug-in sheet includes an insulating strip provided above, wherein plastic elastic clamps and a connection part are connected to the lower part of the insulating strip, wherein the insulating strip and the connection part are provided with a capacitor mounting hole, and wherein fixing clamping strips are provided on the inner wall of the capacitor mounting hole, and wherein the insulating strip has an annular wall which to ether with the insulation strip forms a bowl shape.

2. A fast-mounting capacitor according to claim 1, wherein the capacitor mounting hole has a polygonal shape, and the fixed rod t also has a polygonal shape corresponding to the capacitor mounting hole.

3. A fast-mounting capacitor according to claim 2, wherein the fixed rod of the capacitor is inserted into the capacitor mounting hole and is snapped into the fixed slot with the help of the clamping strips.

4. A fast-mounting capacitor according to claim 3, wherein the lower part of the fixed rod is still situated inside the capacitor mounting hole.

5. A fast-mounting capacitor according to claim 1 or 2, wherein the lower part of the insulating strip is provided with protrusions.

* * * * *